United States Patent

Gaines, Jr. et al.

[15] 3,686,355

[45] Aug. 22, 1972

[54] SHAPED COMPOSITION OF POLYMER AND SURFACE MODIFYING BLOCK COPOLYMER ADDITIVE AND METHOD

[72] Inventors: George L. Gaines, Jr., Scotia; Donald G. Le Grand, Burnt Hills, both of N.Y.

[73] Assignee: General Electric Company

[22] Filed: May 8, 1970

[21] Appl. No.: 35,916

Related U.S. Application Data

[63] Continuation-in-part of Ser. No. 839,694, July 7, 1969.

[52] U.S. Cl............260/824 R, 3/1, 117/124 F, 117/232, 260/30.2, 260/33.8 SB, 260/825, 260/827, 264/340, 264/341, 264/346
[51] Int. Cl............C08g 47/10, C08g 39/10
[58] Field of Search.........................260/824

[56] References Cited

UNITED STATES PATENTS

| | | | |
|---|---|---|---|
| 3,384,599 | 5/1968 | Omietanski et al. | 260/824 |
| 3,189,662 | 6/1965 | Vaughn | 260/824 |
| 3,087,908 | 4/1963 | Caird | 260/824 |
| 2,999,835 | 9/1961 | Goldberg | 260/824 |
| 3,441,534 | 4/1969 | Knaub | 260/825 |
| 3,305,504 | 2/1967 | Huntington | 260/824 |
| 3,342,766 | 9/1967 | Huntington | 260/824 |
| 3,476,827 | 11/1969 | Engelhardt | 260/824 |
| 3,392,143 | 7/1968 | Holub | 260/824 |
| 3,308,080 | 3/1967 | Haenni | 260/825 |
| 3,536,657 | 10/1970 | Noshay et al. | 260/824 |
| 3,553,282 | 1/1971 | Holub | 260/824 |
| 3,573,334 | 3/1971 | Wheeler | 260/824 |
| 3,640,943 | 2/1972 | Bostick et al. | 260/37 |

*Primary Examiner*—Samuel H. Blech
*Attorney*—Paul A. Frank, Charles T. Watts, Jane M. Binkowski, Frank L. Neuhauser, Oscar B. Waddell and Joseph B. Forman

[57] ABSTRACT

A polymer composition having desirable bulk and surface properties comprised of a base polymer and a surface-modifying additive which is a block copolymer. The block copolymer additive contains at least two polymerized comonomers, one of which is compatible with the base polymer and serves to distribute the additive therein, and the second of which is sufficiently surface-active in the base polymer to impart or modify a surface property thereof.

4 Claims, No Drawings

SHAPED COMPOSITION OF POLYMER AND SURFACE MODIFYING BLOCK COPOLYMER ADDITIVE AND METHOD

This application is a Continuation-in-Part of copending U.S. Pat. Application Ser. No. 839,694, filed July 7, 1969, now abandoned.

This application relates to the polymer art. Specifically, it relates to a novel process for imparting a surface property to a polymer or modifying a surface property thereof, such as decrease its coefficient of friction or increase its wettability, without detrimentally affecting its bulk properties. The products resulting from this process are unique in the art.

Although the bulk properties of a polymer are desirable for a particular application, one or more of its surface properties may not be suitable for such application, or may prevent it from being properly processed, thereby requiring a surface-modifying agent. For an agent to be suitable as a surface-modifier for a particular polymer, it should be incompatible with that polymer, i.e. surface-active therein, only to the degree necessary to achieve the desired surface modification, i.e. it should be present at the surface of the polymer in the desired amount and uniformity. In the past, various surface-modifying agents have been used, for example lubricants such as oils and waxes, natural as well as synthetic, have been admixed with a number of polymers to lubricate their surfaces and prevent sticking during a processing operation. Generally, the use of surface-modifying agents in polymers has had a number of disadvantages. For example, even in small amounts, they frequently deteriorate the bulk properties of the polymers thereby limiting their application. In addition, because they are usually significantly incompatible with the polymer, they do not ordinarily properly modify the polymer surface. Specifically, such incompatibility results in poor distribution of the agent in the polymer making its surface properties non-uniform. Thus, because of incompatibility, uniform distribution of the agent in the polymer is achieved only with difficulty and then in only a transient condition, the agent soon separating or exuding from the polymer and concentrating in isolated areas of the polymer surface. Such isolated concentrations at the polymer surface also affect properties of other materials coming into contact therewith.

It is an object of the present invention to solve the problem of satisfying two conflicting property requirements in a single surface-modifying agent. Thus, in pursuit of this goal we discovered a surface-modifying additive which is substantially compatible with a polymer and which provides the desired polymer surface property substantially permanently. Additionally, we conceived a new principle which opens the way to other polymer-surface-modifying agent combinations and the general application of our discovery.

Briefly and generally the composition of the present invention comprises a base polymer and a surface-modifying additive which is a block copolymer. The block copolymer additive contains two polymerized comonomers. One of the polymerized comonomer components is compatible or substantially miscible with the base polymer. Because it, itself, is compatible, it tends to make the block copolymer compatible with the base polymer, thereby facilitating distribution of the block copolymer therein and stabilizing the resulting base polymer-additive composition. By "compatible" it is meant substantially stable therein or substantially miscible therein. An example of such a compatibility-imparting polymerized comonomer is styrene for a base polymer such as polystyrene and polyphenylene oxide. The second polymerized comonomer component must be sufficiently surface-active in the present base polymer-block copolymer additive composition to impart or modify a surface property thereof. Typical examples of such surface-activity-imparting comonomers are organosiloxanes such as dimethylsiloxane, and fluoro-containing monomers such as pentadecafluoro-octyl methacrylate and 2-(N-propylperfluoro-octane sulfonamido) ethyl acrylate. The base polymer of the present composition, i.e. the polymer to which a surface property is to be imparted or a surface property modified, is a solid and may be a homopolymer, a copolymer or even a mixture of polymers.

The block copolymer additives used in the present invention can vary in composition and structure. They may be graft, branched, or linear block copolymers, but being block copolymers, they contain repeating segments or blocks of the same monomeric unit and these blocks have a length close to the average block length for that particular monomer. However, the average block length of one polymerized comonomer component can differ from the average block length of a second polymerized comonomer component and the relative average block lengths largely determine the properties of these block copolymer additives.

An example of a linear block copolymer of A and B monomeric units may have the following structure:

...AAAAABBBAAAABBBBAAAAAABB...

where the A block has an average of 5 units and the B block averages three units. An example of a graft block copolymer of A and B monomeric units may have the following structure:

```
...AAAAAAA...        ...AAAAAA...
       B                    B
       B                    B
       B                    B
       B                    B
```

As is well known in the art, the block copolymer is distinguishable from random copolymers which do not contain substantially uniform blocks of the same comonomer, e.g. copolymers which on the average contain no particular repeating sequence of the same monomeric units and which may have combinations of units varying widely in length and dispersion (e.g., ABAAAABABBAABBBABAB...).

Random copolymers, therefore, are not useful in the present invention since, as a practical matter, they cannot be prepared to have the predetermined properties of the present block copolymers.

The block copolymer additives of the present invention can be prepared by a number of conventional techniques. They should be prepared, however, so that they will impart the desired surface properties to the base polymer as well as have the desired compatibility therewith. The molecular weight of the block copolymer may vary widely but it should be sufficiently high so that it is non-volatile in the present composition and its use. For most applications, the polymerized comonomer component of the block copolymer additive which serves to distribute the additive in the base polymer should have an average block length of at least three monomer units, and the surface-active polymerized comonomer component of the additive which provides the desired surface property or properties should have an average block length of at least five monomer units. The maximum average block length of each comonomer component can only be determined empirically, i.e. it depends largely on the amount of the block copolymer additive used with a particular polymer since the effect of a particular polymerized comonomer component of the block copolymer additive can be reduced by using a smaller amount of the additive.

The amount of the block copolymer used may be determined empirically and would depend largely on its composition as well as the particular application of the shaped polymer composition and on the thickness of the shaped polymer. The block copolymer should not, however, be used in an amount which would undesirably alter the bulk properties of the base polymer to a significant extent. For most applications, the amount of the copolymer additive ranges from about 0.1 to about 5 percent by weight of the base polymer, the amount of a particular additive employed with a particular base polymer being generally in inverse relation to the surface to volume ratio of the ultimate shaped polymer composition body.

The block copolymer additive can be admixed with the base polymer by a number of conventional techniques. For example, it may be mixed in solution or in melt form. The mixing should produce a substantially uniform distribution of the additive in the polymer. Preferably, the mixing should be carried out so that the whole system becomes fluid enough to permit migration of the surface modifying material and development of surface concentration of the additive.

The resulting polymer composition can be shaped by a number of conventional techniques. For example, the polymer composition can be cast from solution to form films or coatings, or it can be molded, as for example, by injection molding or vacuum molding.

Specifically, in forming the block copolymer additive of the present invention, one comonomer is selected to provide the desired surface property, as for example, organosiloxanes or fluorocarbons for water repellency or friction reduction, and as the compatibility-imparting constituent, a second comonomer is selected which is identical to or compatible with the base polymer, as for example, styrene when the base polymer is polystyrene or polyphenylene oxide.

As a further illustration, polycarbonates have good engineering properties such as good dimensional stability and high heat resistance, but their somewhat poor coefficient of friction causes them to wear rapidly in certain applications. Addition of a lubricant, such as a polydimethylsiloxane, does not improve the surface properties of the polycarbonate permanently due to the incompatibility of the materials resulting in migration and ultimate loss of the siloxane from the polycarbonate. However, in accordance with the present invention, the coefficient of friction of polycarbonates can be significantly and substantially permanently reduced by mixing with them polycarbonate-polydimethylsiloxane block copolymer additives. The polycarbonate blocks facilitate distribution of the additive in the polycarbonate and the surface-active polydimethylsiloxane blocks reduce the coefficient of friction of the polycarbonate substantially uniformly over its entire surface area.

The composition of the present invention has a number of practical applications depending on the surface properties desired. For example, the reduction of surface friction with a proper block copolymer additive, such as one containing polydimethylsiloxane blocks, is important in molding and extruding operations and in the processing of textile fibers. Alternatively, a polymer composition formed with a fluorocarbon- or an organosiloxane-containing block copolymer additive may be useful in the fabrication of skis, gears, switches or other moving or sliding components, where polyorganosiloxanes or polyfluorocarbons alone do not provide the required rigidity. To the extend that surface electrical properties such as corona degradation or other failure mechanisms are governed by polymer surface characteristics, they may also be prevented by a suitable surface-active block copolymer additive. Another application is to obtain flame retardancy by surface concentration of flame-retarding molecular species such as bromine by incorporating such species in the structure of the block copolymer additive. In addition, the present composition may be photoprotected by using a protective chromophore in the block copolymer additive to provide a surface protective layer.

The composition of the present invention may also be prepared to have a selectively wettable surface by using block copolymer additives having fluorocarbon or organo-siloxane components to concentrate such components at the polymer surface to produce hydrophobicity. On the other hand, the use of a block copolymer additive containing blocks of a hydrophilic or water soluble comonomer may impart water-wettable surfaces to otherwise hydrophobic polymers. Such compositions may be useful for aircraft windshields or lithographic plates. They may also be useful as substrates for coating processes, such as electroless plating, and also enhance the adhesion of coatings. The polymer composition having specific wettability characteristics may also be made into a stable suspension or used as a selective adsorbent for fractionation processes. The present polymer composition having desirable surface properties as well as bulk properties should also be useful in the biomedical area where polymeric materials are implanted protheses are often limited in application by surface properties which lead to tissue incompatibility, thrombus formation, etc.

All parts and percentages used herein are by weight unless otherwise noted.

The invention is further illustrated by the following examples.

In the following examples, the tests and materials used were as follows:

The coefficient of static friction was obtained using an inclined plane, i.e. the polymer film sample was placed on a smooth board, a metal block was placed on the sample, and the board was tilted until the metal block slid and the coefficient of friction was determined to be the tangent of the angle at which sliding began.

The contact angle was determined by profile view measurements of the contact angle between a drop of liquid and the film surface using a protractor on an eyepiece fitted to a low-power telescope.

The contact angle between a drop of liquid and a plane solid surface is one method of measuring wettability. When the contact angle is zero the liquid is considered to wet the solid completely. The contact angle increases with decreasing wettability, and on a solid having a uniform surface, the contact angle is independent of the volume of the drop.

The polycarbonate used is sold under the trademark Lexan and is a polycarbonate of 2,2-bis(4-hydroxyphenyl) propane (Bisphenol A).

The polycarbonate-polydimethylsiloxane block copolymer was prepared substantially as set forth in U.S. Pat. No. 3,189,662, issued June 15, 1965 and assigned to the same assignee as the present invention. The polycarbonate was the intercondensation product of 2,2-bis(4-hydroxyphenyl) propane and phosgene.

The polystyrene-polydimethylsiloxane block copolymer was prepared substantially as set forth in French Pat. No. 1,526,205 and assigned to the same assignee as the present invention.

Poly(2,6-diphenyl-1,4-phenylene oxide) was prepared substantially as set forth in U.S. Pat. No. 3,432,466, issued Mar. 11, 1969, and assigned to the same assignee as the present invention.

The polydimethylsiloxane-polydiphenylsiloxane-polymethylphenylsiloxane block copolymer was prepared as disclosed in U.S. Pat. No. 3,337,497, issued Aug. 22, 1967.

The poly(2,6-diphenyl-1,4-phenylene oxide)-polydimethylsiloxane block copolymer was prepared by coupling of difunctional polydiphenylphenylene oxide oligomers with linear $\alpha,\omega$-diaminodimethylsiloxanes. Specifically, to prepare the oligomers, a poly(2,6-diphenyl-1,4-phenylene oxide) having an intrinsic viscosity of 0.55 measured in toluene at 25° C was equilibrated with 3,3',5,5'-tetraphenyl-4,4'-dihydroxybiphenyl in the presence of tetraphenyldiphenoquinone in chlorobenzene as disclosed in copending patent application Ser. No. 547,180, filed May 3, 1966 by Glenn D. Cooper and Alfred R. Gilbert, and U.S. Pat. No. 3,367,978 issued Feb. 6, 1968 to Dwain M. White and assigned to the same assignee as the present invention. The oligomers were then reacted in toluene with the diaminodimethylsiloxane in an inert atmosphere.

The polydimethylsiloxane used was a silicone gum (SE 76) having a bulk viscosity of $\eta = 2 \times 10^5$ poises.

The particular composition and average block length of the block copolymer was determined by the method of preparation and by nuclear magnetic resonance spectroscopy.

The molecular weight is the number average molecular weight $M_n$(osmotic).

EXAMPLE 1

In this example the wettability of films formed from polymer compositions of the present invention was compared to the wettability of films formed from the base polymer alone, the block copolymer alone, and that of a component of the block copolymer.

In Table I, film Sample A was prepared by dissolving the polycarbonate in methylene chloride at room temperature, coating the resulting solution on a clean glass surface, and allowing the coating to dry in air. Film Samples B and C were formed in the same manner as Sample A except that a block copolymer additive was also dissolved in the methylene chloride in an amount of 1 percent and 4 percent by weight of the polycarbonate respectively. The block copolymer had a number average molecular weight of 57,000 and was composed of 40 percent by weight polycarbonate having an average block length of 3.89 monomer units and 60 percent by weight polydimethylsiloxane having an average block length of 20 monomer units.

In Samples D and E the films were formed in the same manner as Sample A except that the block copolymer and polydimethylsiloxane gum alone were used respectively.

TABLE I

| Film Sample | Film Composition | Contact Angles Ethylene glycol | Propylene glycol |
|---|---|---|---|
| A | Polycarbonate (molecular wt. 90,000) | 68° | 57° |
| B | Polycarbonate and 1% of block copolymer of 40% polycarbonate-60% polydimethylsiloxane | 82° | 69° |
| C | Polycarbonate and 4% of block copolymer of 40% polycarbonate-60% polydimethylsiloxane | 83° | 70° |
| D | Block copolymer of 40% polycarbonate-60% polydimethylsiloxane | 89° | 79° |
| E | Polydimethylsiloxane | 92° | 85° |

As can be seen from Table I, the wettability of the polycarbonate film decreases significantly when it contains the block copolymer additive even in an amount as small as 1 percent by weight, as shown by Film Sample B, which illustrates the substantial activity of the polydimethylsiloxane component of the additive. In addition, Film Samples B and C were as uniform in appearance as Film Sample A indicating the good compatibility and stability of the block copolymer in the polycarbonate.

EXAMPLE 2

In this example films were cast from methylene chloride solutions in the same manner as disclosed in Example 1 and the coefficient of static friction of each film was determined. The results are shown in Table II. The amount of block copolymer additive specified in Table II is percent by weight of the polycarbonate.

TABLE II

| Film sample | Polymer composition of film | Coefficient of static friction |
|---|---|---|
| F | Polycarbonate (mol. wt. 90,000) | 0.487 |
| G | Block copolymer of 77% polycarbonate (avg. block length 20 monomer units)–23% polydimethylsiloxane (avg. block length 20 monomer units) (avg. mol. wt. 53,000) | |
| H | Polycarbonate and 3% of block copolymer of Sample G. | 0.424 |
| I | Polycarbonate and 5% of block copolymer of Sample G. | 0.424 |
| J | Polycarbonate and 2% of block copolymer of Sample G. | 0.424 |
| K | Block copolymer of 87% polycarbonate (avg. block length 40 monomer units)–13% polydimethylsiloxane (avg. block length 20 monomer units). | 0.383 |
| L | Polycarbonate and 2% of block copolymer of Sample K. | 0.383 |
| M | Polycarbonate and 3% of block copolymer of Sample K. | 0.383 |
| N | Polycarbonate and 1% of block copolymer of 40% polycarbonate (avg. block length 3.6 monomer units)–60% polydimethylsiloxane (avg. block length 20 monomer units) (mol. wt. of block copolymer was 57,000). | 0.230 |

TABLE II—Continued

| Film sample | Polymer composition of film | Coefficient of static friction |
|---|---|---|
| O | Polycarbonate and 0.1% of block copolymer of 40% polycarbonate (avg. block length 3.6 monomer units)–60% polydimethylsiloxane (avg. block 20 monomer units) (mol. wt. of block copolymer was 57,000). | 0.17 |

Table II illustrates the significant surface modification obtainable by the present invention as shown by Film Samples H, I, J, L, M and N. Specifically, Table II shows that a very small amount of the surface active component of a block copolymer produces the desired modification. This is particularly illustrated by a comparison of the coefficient of friction of polycarbonate alone, Film Sample F, with that of Film Sample L where only 2 percent of a block copolymer was used and that of Film Sample N where only 1 percent of a block copolymer was used. Since only a small amount of the surface active component produces the desired surface modification according to the present invention, the bulk properties of the base polymer are not affected significantly. In addition, the compositions of the present invention, Film Samples H, I, J, L, M, N and O, were as uniform in appearance as Film Sample F of polycarbonate alone indicating the good compatibility and stability of the block copolymer additive in the polycarbonate.

EXAMPLE 3

A 26 percent polystyrene (avg. block length 50 monomer units) - 74 percent polydimethylsiloxane (avg. block length 200 monomer units) block copolymer having a number average molecular weight of 94,500 was used in this example.

Polystyrene having a number average molecular weight of about 63,500 and sold under the trademark of BMS polystyrene and the block copolymer, in an amount of 0.025 percent by weight of the polystyrene, were dissolved in methylene chloride at room temperature. The resulting solution was coated on a clean glass surface and allowed to dry in air.

The coating was stripped from the glass surface and the wetting characteristics as well as coefficient of static friction of both sides of the film, i.e. the surface of the film exposed to air during drying as well as the surface adjacent the substrate, were determined. For comparison, the same polystyrene was dissolved in methylene chloride and the resulting solution was cast onto a glass surface in the same manner and its characteristics were tested in the same manner. The results are shown in Table III.

TABLE III

| Scan | Serial date |
|---|---|
| First two bytes | 100XXXX 00000011 |
| 4 | 001101 100111 |
| 5 | 110001 1000001 |
| 6 | 1001 100001 |
| 7 | 101 1001 |
| 8 | 101 111 000111 000011 101010 |
| 9 | 101 1101 1001 111 000011 000010 100110 |
| 10 | 0 101 101 0 101 1101 |
| 14 | 0 1101 101 0 101 1101 |
| 15 | 0 0 0 0 0 0 |
| 25 | 101 0 101 111 101010 |
| 28 | 1001 1001 0 1001 |
| 29 | 111 010000 100100 |
| 30 | 1111 |

Table III shows that the wettability of the lower surface of film Sample Q, i.e. the surface cast against the glass, closely resembles that of polystyrene alone as shown by film Sample P. On the other hand, the upper surface of film Sample Q, i.e. the surface exposed to air during drying, is less wettable, as illustrated by the higher contact angles, and more slippery, as shown by the lower static friction coefficient. This indicates the preferential concentration of the siloxane blocks at the free surface of the film, i.e. the surface exposed to air during drying. In addition, Film Samples P and Q were the same in appearance indicating the substantially complete compatibility and stability of the block copolymer in the polystyrene.

EXAMPLE 4

In this example, the base polymer was poly-(2,6-diphenyl-1,4-phenylene oxide) and had an intrinsic viscosity of approximately one as measured in chloroform at 25° C. In Table IV, Film Sample R, the control sample, was prepared by dissolving the poly-(2,6-diphenyl-1,4-phenylene oxide) in methylene chloride at room temperature, coating the resulting solution on a clean glass microscope slide and drying the coating at 175° C for 30 minutes. Film samples S through X in Table IV were formed in the same manner as Film Sample R except that the block copolymer additive was also dissolved in the methylene chloride in the specified amount which is percent by weight of the base polymer. The block copolymer in Film Samples S and T was 49 percent by weight poly-(2,6-diphenyl-1,4-phenylene oxide) and 51 percent by weight polydimethylsiloxane and had an intrinsic viscosity of 0.45 in toluene at 25° C.

The block copolymer in film samples U through X was a terpolymer composed of 47.8 percent by weight polydimethyl-siloxane having an average block length of 700 monomer units, 10.3 percent by weight polymethylphenylsiloxane having an average block length of 41 monomer units and 41.9 percent by weight polydiphenylsiloxane having an average block length of 115 monomer units. This terpolymer was a dry solid and had an intrinsic viscosity of 2.185 measured in orthodichlorobenzene at 120° C.

TABLE IV

| Film Sample | Composition of Film | Contact Angle (dipropylene glycol) | Static Coefficient Of Friction |
|---|---|---|---|
| R | Poly-(2,6-diphenyl-1,4-phenylene oxide)[η]~1.0 | 23° | 0.36 |
| S | Poly-(2,6-diphenyl-1,4-phenylene oxide)and 0.5% ¹block copolymer of 49% by wt.poly-(2,6-diphenyl-1,4-phenylene oxide)-51% by wt. polydimethylsiloxane | 62° | 0.052 |
| T | Same as S but with 5.0% block copolymer | 63° | 0.070 |
| U | Poly-(2,6-diphenyl-1,4-phenylene oxide)and 0.5% by wt.block copolymer of polydimethylsiloxane-polymethylphenylsiloxane-polydiphenylsiloxane | 68° | 0.035 |
| V | Same as U but with 1.0% block copolymer | 69° | 0.035 |
| W | Same as U but with 2.0% block copolymer | 69° | 0.018 |
| X | Same as U but with 5.0% | 69° | 0.052 |

[1] Average structure $[(P_{9.3}-D_7)_3 - P_{9.3}-D_{106}]_x$ where P = (2.6-diphenyl-1,4-phenylene oxide) D = dimethylsiloxane.

Table IV illustrates the significant polymer surface modification obtainable by the present invention. Specifically, Samples S through X, show the significant decrease in wettability and friction produced by incorporating a small amount of a proper block copolymer into the poly-(2,6-diphenyl-1,4-phenylene oxide). Film Samples U through X illustrate that phenyl substituents in a siloxane can serve as the compatibility-imparting component of the block copolymer. In addition, Film Samples S through X appeared to be the same in appearance as Film Sample R indicating the substantially complete compatibility and stability of the additive in the polymer.

In some instances, the compatibility-imparting polymerized comonomer may differ substantially in structure from the base polymer but, in its block form, as a constituent of the block copolymer, it is capable of acting as the compatibility-imparting component of the block copolymer. For example, we have found that a polycarbonate-polydimethylsiloxane block copolymer can markedly reduce the friction coefficient of a polyamide-imide wire enamel in a substantially uniform and permanent manner. A low coefficient of friction is a desirable property for magnet wire enamels since this permits easier and more compact winding of the wire on coils and armatures, etc.

EXAMPLE 5

In this example, three different polycarbonate-polydimethylsiloxane block copolymers were used to modify the surface of a polyamide-imide sold under the trademark Amoco AI–10 which is a conventional magnet wire enamel and which is prepared by reacting equimolar amounts of trimellitic anhydride monoacid chloride and methylene dianiline.

One block copolymer had a number average molecular weight of 47,000 and was composed of 35 percent by weight polycarbonate having an average block length of 3.5 monomer units and 65 percent by weight of polydimethylsiloxane having an average block length of 20 monomer units.

A second block copolymer had a number average molecular weight of 44,000 and was composed of 50 percent by weight polycarbonate having an average block length of 6 monomer units and 50 percent by weight of polydimethylsiloxane having an average block length of 20 monomer units.

A third block copolymer had a number average molecular weigh of 53,000 and was composed of 75 percent by weight polycarbonate having an average block length of 18.5 monomer units and 25 percent by weight of polydimethylsiloxane having an average block length of 20 monomer units.

A solution of each block copolymer was formed at room temperature by dissolving 20 grams of the block copolymer in 100 cc of methylene chloride.

A solution was also formed at room temperature by dissolving 20 grams of the polyamide-imide in 100 cc OF N-methyl pyrrolidone.

Enough of the block copolymer solution was added to an aliquot of the polyamide-imide solution to form a solution constituting 1 percent block copolymer by weight on the basis of the polyamide-imide. A small portion of each such solution was then spread on a glass microscope slide, and the slides were placed in an oven at a temperature of about 165° C for 30 minutes.

After cooling to room temperature, the coated slides were examined for friction coefficient and wettability by measuring the contact angle of ethylene glycol.

A control sample, in which the coating was the Amoco AI–10 enamel with no additive, exhibited a contact angle of 45° and a static friction coefficient of greater than 0.5. The three samples of the Amoco AI–10 enamel containing the block copolymer additive all exhibited contact angles of 90+2° and friction coefficients of 0.14 or less. All of the coatings were clear and relatively smooth indicating the good compatibility and stability of the block copolymer in the wire enamel.

EXAMPLE 6

In this example, a solution of Amoco AI–10 in N-methylpyrrolidone was formed at room temperature.

A solution of a polydiphenylsiloxane-polydimethylsiloxane block copolymer was also formed at room temperature in benzene. The block copolymer was a dry solid and had an intrinsic viscosity of 1.45 measured in orthodichlorobenzene at 120° C. It was composed of 35.6 percent by weight polydiphenylsiloxane having an average block length of 420 monomer units and 40 percent by weight polydimethylsiloxane having an average block length of 840 monomer units and 24.4 percent by weight of polymethylphenylsiloxane having an average block length of 410 monomer units.

A portion of block copolymer solution was added to an aliquot of the Amoco AI–10 solution to form a solution containing the block copolymer in an amount of 1 percent by weight of the Amoco AI–10. Two additional solutions were formed in the same manner except that one contained the block copolymer in an amount of 2 percent by weight of the Amoco AI–10 and the other solution contained the block copolymer in an amount of 5 percent by weight of the Amoco AI–10.

Each solution was spread on a glass microscope slide, and the slides were placed in an oven for one hour at 150° C.

After cooling to room temperature, the coated slides were examined for friction coefficient and wettability by measuring the contact angle of ethylene glycol. The three samples all exhibited contact angles of 90° and had a coefficient of static friction of 0.158 or less.

The measurements of Example 3 show preferential concentration of the polydimethylsiloxane block copolymer additive at the upper, air-exposed side of the cast film, while the lower side of the film which was cast against glass resembled polystyrene in its properties.

In the present process, effective concentration of the surface-active block copolymer additive at the surface of the present shaped polymer composition appears to depend on the nature of the substrate against which shaping, as for example solvent casting or molding, is carried out. When the shaping substrate has a low energy surface such as Teflon, the shaped polymer composition has an effective concentration of the block copolymer additive at its entire surface, for example at the air-exposed polymer surface as well as at the polymer surface separated from the low energy substrate. However, when the present composition is shaped against a substrate having a high energy surface such as glass, mica, metals or metal oxides, there is an effective concentration of the block copolymer additive only at the air-exposed surface of the shaped polymer composition but not at the polymer surface separated from the high energy substrate surface. Specifically, the separated polymer surface resembles the base polymer in its properties. It is believed that the block copolymer adsorbs at the high energy substrate-polymer interface during shaping but is retained on the high energy surface substrate when the shaped polymer composition is separated from such substrate surface since, after one or a few of such shapings, the high energy surface substrate generally becomes a low energy surface substrate.

In one embodiment of the present process, a shaped composition having a surface with properties resembling those of the base polymer is treated to allow the block copolymer additive to migrate to the surface. One technique comprises annealing the shaped polymer composition in an atmosphere in which it is substantially inert, which may be argon, a substantial vacuum or even air, at a temperature which allows motion of the polymer molecules so that the low energy component, as for example polydimethylsiloxane, of the block copolymer additive can pass to the surface. The particular temperature at which the shaped polymer composition is annealed is determinable empirically. It should not be so high as to deform the shaped polymer composition, and preferably, it should not be so low as to require an impracticably long period of heating time to produce the desired surface concentration of the block copolymer. Generally, a temperature ranging from about 50° C to about 200° C is satisfactory for most of the present polymer compositions with correspondingly long periods of annealing being required for the lower heating temperatures. An annealing temperature ranging from about 100° to 150° C is preferred for a number of the present polymer compositions to develop an effective surface concentration of the block copolymer additive in a suitable period of time.

A second technique for making the block copolymer component migrate to the surface of the present shaped polymer composition, when such migration is desired, comprises applying a solvent for the base polymer to such surface. Such solvent application should soften the surface sufficiently to promote motion of the polymer molecules to allow the block copolymer additive to pass to the surface. The solvent application should not be such as to deform the shaped polymer composition. If desired, the dissolving power of a solvent can be controlled, i.e. decreased, by mixing it with a non-solvent to produce a solution or mixture which softens the polymer surface satisfactorily without dissolving it to any significant extent.

The techniques of developing an effective concentration of the block copolymer additive at the surface of a shaped polymer composition of the present invention are illustrated by the following examples.

EXAMPLE 7

A 35 percent polycarbonate (average block length 6.6 monomer units)-65 percent polydimethylsiloxane (average block length 40 monomer units) block copolymer having a number average molecular weight of 91,600 was used in this example. The polycarbonate used was Lexan molecular weight grade 125.

A solution of the polycarbonate in methylene chloride was formed at room temperature and was used for casting Samples Y and AA in Table V.

A methylene chloride solution of the polycarbonate and the block copolymer additive in an amount of 1 percent by weight of the polycarbonate was also formed at room temperatures and used for casting Samples Z and BB in Table V.

All of the glass plates used as substrates were initially cleaned with alkaline detergent, thoroughly rinsed with distilled water and air dried. Two of the cleaned glass plates were used as substrates for Samples Y and Z.

Two of the cleaned glass plates were treated to deposit a thin adherent dimethylsilicone layer thereon. This was done by rinsing the glass substrates with a 0.1 percent solution of 1000 cs. dimethylsilicone fluid in methylene chloride for about five minutes and then heating them in an air oven for 1 hour at 200° C. After cooling these substrates to room temperatures, they were rinsed thoroughly with methylene chloride and allowed to dry in air.

The polycarbonate solution was coated on a surface of one clean glass substrate and one silicone-treated glass substrate, and the coatings were allowed to dry in air at room temperature. In the same manner, the polycarbonatecopolymer additive solution was coated on one clean glass substrate and one silicone-treated glass substrate and the coatings allowed to dry in air at room temperature. Ethylene glycol contact angles of the upper side, i.e. the air-exposed side, of the resulting cast films were determined. Each film was then separated from the substrate, and the ethylene glycol contact angles of the lower side, i.e. the surface of the polymer film which had been in contact with the substrate, were determined. The results are shown in Table V.

TABLE V

| Film Sample | Film Composition | Cast on Clean Glass Upper Side | Lower Side |
|---|---|---|---|
| Y | Polycarbonate | 49° | 48° |
| Z | Polycarbonate +1% block copolymer | 84° | 59° |
| | | Cast on Silicone-Treated Glass Upper Side | Lower Side |
| AA | Polycarbonate | 48° | 50° |
| BB | Polycarbonate +1% block copolymer | 84° | 90° |

Table V illustrates that effective surface concentration of the block copolymer is produced on both sides of the film when it is formed in contact with a low energy surface such as the silicone-treated glass. However, effective surface concentration of the copolymer is produced only on the upper air-exposed side of the film when the film is formed against a high energy surface such as clean glass as shown by Sample Z.

EXAMPLE 8

Table VI illustrates the effects various substrates have on effective surface concentration of the block copolymer. The block copolymer used was the same as disclosed in Example 7. Each polymer solution was cast from methylene chloride on the surface of the substrate and allowed to dry in air at room temperatures.

Molded sheets were prepared by first dissolving the polymers in methylene chloride and precipitating with excess methanol. After vacuum drying, these powders were molded between plates of the disclosed substrate in a hydraulic press whose platens were held at 240° C; for each sample, a one minute preheat period was followed by one minute of compression at 500 lbs. gauge pressure.

The muscovite mica of Table VI was freshly cleaved before use.

TABLE VI

| Film Sample | Film Composition | Ethylene glycol contact angles Upper Side | Lower Side |
|---|---|---|---|
| | Polycarbonate(Lexan molecular weight grade 105) cast from methylene chloride | | |
| CC | on clean glass | 65° | 52° |
| DD | on Teflon | 68° | 71° |
| | Polycarbonate(Lexan molecular weight grade 125)compression-molded | | |
| EE | on muscovite mica | 54° | — |
| FF | on Teflon | 66° | — |
| | Polycarbonate(Lexan grade 105) + 1% block copolymer cast from methylene chloride | | |
| GG | on clean glass | 89° | 68° |
| HH | on Teflon | 90° | 89° |
| | Compression-molded | | |
| II | on Teflon | 90° | — |
| JJ | on muscovite mica | 56° | — |
| KK | Sample JJ annealed 18 hr. at 140°C in an air oven. | 91° | — |

Table VI shows the effects of high energy surface substrates such as mica and clean glass and low energy surface substrates such as Teflon. Sample KK illustrates the annealing technique for developing effective surface concentration of the block copolymer.

EXAMPLE 9

Film Sample Z of Example 7 may be used in this example. A number of additional films cast on clean glass substrates as disclosed in Example 7 from the same methylene chloride solution of polycarbonate and block copolymer disclosed in Example 7 may also be prepared.

The films would then be separated from the substrates and each film would have a significantly higher ethylene glycol contact angle on its upper air-exposed side than on its lower side, i.e. the side which had been in contact with the substrate.

One film would then be rinsed at room temperatures for about five seconds with n-hexane which is a nonsolvent for polycarbonate. There would be no change in the appearance of the film, and the ethylene glycol contact angles on the two surfaces of the film would be unchanged.

A second film would then be rinsed with benzene at room temperatures and would swell and be partly dissolved.

A third film may be supported and rinsed rapidly with benzene with the result that film integrity is maintained. Both sides of the film would have ethylene glycol contact angles near 90° which is a wettability corresponding to a silicone-rich surface.

A fourth film may then be rinsed with a mixture of about 5 percent by volume benzene in n-hexane. This would not alter the appearance of the film, but after rinsing at room temperatures both sides would exhibit ethylene glycol contact angles near 90°.

EXAMPLE 10

The methylene chloride solution of polycarbonate and block copolymer used in this example was the same as that disclosed in Example 7 except that the copolymer had a number average molecular weight of about 50,000. A film was cast from this solution on a cleaned glass substrate as disclosed in Example 7.

The cast film was separated from the glass and the ethylene glycol contact angle of the polymer film surface which had been in contact with the glass substrate was determined to be 50°. This film was annealed in an air oven at a temperature of 140° C for 18 hours and then allowed to cool to room temperatures. The ethylene glycol contact angle of the same film surface was again determined and found to have increased to 91°.

What is claimed is:

1. A shaped composition consisting of a base polymer and a block copolymer additive to which the block copolymer additive imparts the desired surface characteristics of significantly decreased wettability and friction without undesirably altering the bulk properties of the base polymer to a significant extent, said block copolymer additive being comprised of a first polymerized comonomer and a second polymerized comonomer, said first polymerized comonomer having an average block length of at least three monomer units and being sufficiently compatible with and miscible in the base polymer to make said additive stable therein, and said second polymerized comonomer having an average block length of at least five monomer units and being sufficiently surface-active in the composition to provide said desired surface characteristics, said base polymer being a polycarbonate of bisphenol-A and said additive being a polycarbonate of bisphenol-A-polydimethylsiloxane block copolymer, and said additive being present in an amount ranging from about 0.1 to about 5 percent by weight of said base polymer.

2. A process for preparing a shaped polymeric composition of a base polymer and a block copolymer additive to which the block copolymer additive imparts the desired surface characteristics of significantly decreased wettability and friction without undesirably altering the bulk properties of the base polymer to a significant extend, said block copolymer additive being comprised of a first polymerized comonomer and a second polymerized comonomer, said first polymerized comonomer having an average block length of at least three monomer units and being sufficiently compatible with and miscible in the base polymer to make said additive stable therein, and said second polymerized comonomer having an average block length of at least five monomer units and being sufficiently surface-active in the composition to provide the desired surface characteristics which consists of blending said base polymer and said block copolymer additive to produce a substantially uniform distribution of the additive in the polymer and to permit migration of the additive to the composition surface, and shaping said composition, said base polymer being a polycarbonate of bisphenol-A and said additive being a polycarbonate of bisphenol- A-polydimethylsiloxane block copolymer, said additive being present in an amount ranging from about 0.1 to about 5 percent by weight of said base polymer.

3. A process according to claim 2 wherein said composition is shaped and annealed at a temperature sufficient to impart said desired characteristic by said block copolymer over substantially its entire surface.

4. A process according to claim 2 wherein said composition is shaped and a solvent for said base polymer is applied to said shaped composition to soften its surface sufficiently to impart said desired characteristic by said block copolymer over substantially its entire surface.

* * * * *